United States Patent
Finkowski et al.

(10) Patent No.: US 6,920,739 B2
(45) Date of Patent: Jul. 26, 2005

(54) FOOD PRODUCT MARKING SYSTEMS AND METHODS

(75) Inventors: James W. Finkowski, Andover, MN (US); Mark E. Arlinghaus, Minneapolis, MN (US)

(73) Assignee: The Pillsbury Company, Minneapolis, MN (US)

( * ) Notice: Subject to any disclaimer, the term of this patent is extended or adjusted under 35 U.S.C. 154(b) by 246 days.

(21) Appl. No.: 10/369,203

(22) Filed: Feb. 19, 2003

(65) Prior Publication Data

US 2004/0159076 A1 Aug. 19, 2004

(51) Int. Cl.⁷ .......................... B65B 63/00; A21C 15/04
(52) U.S. Cl. .............................. 53/435; 53/475; 53/516; 53/244
(58) Field of Search ......................... 53/435, 443, 475, 53/495, 498, 516, 520, 540, 244

(56) References Cited

U.S. PATENT DOCUMENTS

| | | |
|---|---|---|
| 2,008,036 A | 7/1935 | Pointon et al. |
| 2,188,837 A | 1/1940 | Gregory et al. |
| 2,307,510 A | 1/1943 | Johnsen |
| 2,408,838 A | 10/1946 | Wilckens et al. |
| 2,573,100 A | 10/1951 | Haecks |
| 2,585,379 A | 2/1952 | Fulmer |
| 2,623,479 A | 12/1952 | Clinton |
| 2,703,668 A | 3/1955 | Baechle |
| 2,707,922 A | 5/1955 | Ferguson et al. |
| 2,728,508 A | 12/1955 | Marasso |
| 2,897,772 A | 8/1959 | Hunter |
| 2,941,341 A | 6/1960 | Clinton |
| 2,971,309 A | 2/1961 | Miskel et al. |
| 3,001,344 A | 9/1961 | Morton et al. |
| 3,065,584 A | 11/1962 | Coleman |
| 3,106,048 A | 10/1963 | Marasso et al. |
| 3,154,986 A | 11/1964 | Reid |
| 3,226,912 A | 1/1966 | Raye |
| 3,273,300 A | 9/1966 | Watrous et al. |
| 3,339,335 A | 9/1967 | Bowden |
| 3,427,783 A | 2/1969 | Reid |
| 3,458,970 A | 8/1969 | Reid et al. |
| 3,490,354 A | 1/1970 | Fehr et al. |
| 3,498,019 A | 3/1970 | Rait |
| 3,933,068 A * | 1/1976 | Rejsa .......................... 53/516 |
| 4,085,563 A | 4/1978 | Egee et al. |
| 4,506,488 A | 3/1985 | Matt et al. |
| 4,668,524 A | 5/1987 | Kirkpatrick |
| 4,797,291 A | 1/1989 | Pierce et al. |
| 4,809,575 A | 3/1989 | Swanson |
| 4,881,356 A | 11/1989 | Beezer et al. |
| 4,936,200 A | 6/1990 | Buhler et al. |
| 4,938,126 A | 7/1990 | Rubio et al. |
| 5,037,350 A * | 8/1991 | Richardson et al. .......... 83/326 |

(Continued)

Primary Examiner—Stephen F. Gerrity
(74) Attorney, Agent, or Firm—Kagan Binder, PLLC (57) ABSTRACT

A method and apparatus for aligning a mark to a plurality of individual pieces of food product to be divided from a sheet of food product before the individual pieces of food product are at least partially divided from the sheet of food product. In an aspect of the invention, the method includes the steps of providing a sheet of food product, transferring the sheet of food product to an intermittently movable conveyor, marking the sheet of food product, feeding the marked sheet of food product to a cutting plate, and dividing, at least partially, the sheet of food product into individual pieces of food product. In another aspect of the present invention, a system for aligning a mark to a plurality of individual pieces of food product to be divided from a sheet of food product before the individual pieces of food product are at least partially divided from the sheet of food product may generally include a supply device, an intermittently movable conveyor, an accumulating zone, a marking head, and at least one cutting plate. Preferably, the supply device can supply a continuous sheet of food product.

20 Claims, 6 Drawing Sheets

U.S. PATENT DOCUMENTS

| | | |
|---|---|---|
| 5,133,447 A | 7/1992 | Florindez |
| 5,247,782 A | 9/1993 | Rejsa |
| 5,388,390 A | 2/1995 | Finkowski et al. |
| 5,535,575 A | 7/1996 | Finkowski et al. |
| 5,678,394 A | 10/1997 | Finkowski et al. |
| 5,768,856 A | 6/1998 | Odenthal |
| 6,004,595 A | 12/1999 | Ray et al. |
| 6,164,174 A | 12/2000 | Sigurdsson et al. |

* cited by examiner

FOOD PRODUCT MARKING SYSTEMS AND METHODS

FIELD OF THE INVENTION

The present invention relates generally to methods for processing food products, such as for marking food products. In particular, the present invention is directed to systems and methods for aligning a mark (pattern, design and/or label) with an individual piece of food product to be divided from a sheet of food product.

BACKGROUND OF THE INVENTION

Consumers commonly enjoy the convenience of packaged food products such as dough products. In particular, raw dough products have gained commercial success as provided in frozen or refrigerated forms to facilitate consumers making home baked dough products. Moreover, such raw dough products are typically packaged to facilitate consumer use, as desired.

Many dough products suitable for packaging as frozen or refrigerated products have been developed. As an example, rolled dough products such as cinnamon rolls and other pastries as well as non-rolled dough products or slugs such as biscuits, cookies, rolls and the like are frequently packaged in frozen or refrigerated forms. Rolled dough products are typically made by providing a strip or sheet of dough (with or without a topping or filling) and rolling the strip or sheet as a spiral. In the case of a dough sheet, the roll can be divided transversely into plural dough products. For certain packing and handling applications, it is desirable that non-rolled dough products have the general appearance of a rolled dough product such as a cinnamon roll. As such, a dough slug may be scored with a spiral pattern to create a single serving portion that has the general appearance of a rolled dough product. Such scored dough slugs may be more economical to produce thereby reducing the cost to the consumer.

Devices for creating consumer usable packages of raw dough slugs that cut a sheet of food product such as dough into individual slugs or pieces and the packing the individual dough pieces into containers have been developed. For example, U.S. Pat. No. 3,427,783 to Reid, which is fully incorporated herein by reference, describes one such dough cutting and packing apparatus. Additional other features and modifications applicable to the Reid apparatus are included in U.S. Pat. No. 5,247,782 to Rejsa, which is also fully incorporated herein by reference.

The cutting and packaging apparatuses of Reid and Rejsa include an endless cutting unit formed by a plurality of intermittently movable, interconnected cutting plates. A sheet of dough is usually continuously supplied to the apparatus by a conveyor and enters the cutting and packaging apparatus at a first end of the cutting unit. A transversely extending roll (transverse to the direction of dough sheet travel) presses the dough sheet against the cutting unit to divide the dough sheet into a plurality of individual dough pieces that are held within hexagonally shaped cutting openings formed in the cutting plates. The apparatus further includes plungers positioned above the cutting unit that can be moved in a reciprocating manner relative to the cutting unit by way of a microprocessor-controlled servomotor as described by Rejsa. During a dwell period of the intermittent motion of the plates, the plungers move downward so they contact the dough pieces held within the hexagonally shaped openings in the cutting plates thereby removing the dough pieces from the cutting unit. Continued downward movement of the plungers causes the individual dough pieces to enter the open ends of containers positioned beneath the cutting unit. The reciprocating movement of the plungers is synchronized with the intermittent movement of the cutting unit so that the cutting unit only moves when the plungers are not extending into or through the openings in the cutting plates.

As mentioned above, for certain products it may be desirable to score a dough slug with a spiral pattern to give it the appearance of a rolled dough product. Such scoring is conventionally done while the dough sheet is positioned on the continuous conveyor that supplies the dough sheet to the cutting and packaging apparatus. A difficulty with such an approach is that it can be difficult to assure proper alignment of such a spiral pattern or scoring on the dough sheet with the cutter that will divide that scored portion from the dough sheet (i.e. so the dough product is properly scored). This is due, in part, to the transition from continuous to intermittent motion that the dough sheet experiences after it is scored and before it is cut.

The dimensional stability of dough that is transferred between conveyors can be difficult to control. That is, certain food products provided in sheet form, such as sheets of certain dough based food products, can be dimensionally unstable. Such dimensional instability can be due to internal stresses in a food product itself or may arise from external forces such as from gravity or from certain processing steps. A sheet of food product such as a dough product that is transferred from continuous motion to intermittent motion may be significantly distorted or shifted as a result of such transfer. As such, a score formed on a sheet of dough product can become misaligned during such conventional processing, such as a cutting process to divide the sheet of dough product into individual pieces, as a result of such transfer between conveyors.

SUMMARY OF THE INVENTION

The present invention overcomes the disadvantages and shortcomings of the prior art by providing systems and methods for providing a mark such as an impression, imprint or deposit to an individual piece of food product prior to its division from a sheet of food product while at the same time maintaining alignment of the marking with the product shape as it is cut from the sheet of food product.

In one aspect of the present invention, a method of aligning a mark to a plurality of individual pieces of food product to be divided from a sheet of food product before the individual pieces of food product are at least partially divided from the sheet of food product is provided. Generally, the method includes the steps of providing a sheet of food product, transferring the sheet of food product to an intermittently movable conveyor, marking the sheet of food product, feeding the marked sheet of food product to a cutting plate, and dividing, at least partially, the sheet of food product into individual pieces of food product. In a preferred aspect of the present invention, the sheet of food product may be provided as a continuously fed sheet of food product. The continuously fed sheet of food product is preferably transferred to an intermittently movable conveyor by way of an accumulating zone that can accumulate at least a portion of the continuously fed sheet of food product during a dwell or rest period of the intermittently movable conveyor. In accordance with the present invention, the marking step is performed while the sheet of food product is carried by the intermittently movable conveyor. The cutting plate may be an intermittently movable cutting plate having a plurality of cutting openings. Preferably, the marked sheet of food product is fed to the intermittently movable cutting plate so that the cutting openings are aligned to the marked sheet of food product as desired. The step of feeding the marked sheet of food product to the intermittently movable cutting plate may comprise transferring the marked sheet of food product from the intermittently movable conveyor to the intermittently movable cutting plate. Additionally, the step of dividing, at least partially, the sheet of food product into individual pieces of food product preferably comprises forcing the sheet of food product through the cutting openings of the cutting plate with a compression device.

Additional aspects of the present invention relate to, the marking step which may include stamping, embossing, imprinting or rolling for cutting or impressing a pattern onto the plurality of individual pieces of food product to be divided from the sheet of food product. The marking step may provide for the depositing an additional food product or other material (such as decorative elements) onto the plurality of individual pieces of food product to be divided from the sheet of food product.

In another aspect of the present invention, a system for aligning a mark to a plurality of individual pieces of food product to be divided from a sheet of food product before the individual pieces of food product are at least partially divided from the sheet of food product is provided. Generally, the system may include a supply device, an intermittently movable conveyor, an accumulating zone, a marking device, and at least one intermittently movable cutting plate. Preferably, the supply device is capable of supplying a continuous sheet of food product. The intermittently movable conveyor is preferably operatively positioned with respect to the supply device. Also, the intermittently movable conveyor preferably includes a surface for supporting and carrying the sheet of food product supplied by the supply device. The accumulating zone is preferably formed between the supply device and the intermittently movable conveyor for permitting accumulation of a portion of the sheet of food product as the sheet of food product transfers from the continuous motion of the supply device to the intermittent motion of the intermittently movable conveyor. The marking device is preferably operatively positioned with respect to the surface of the intermittently movable conveyor for marking the sheet of food product. Preferably, the marking may be aligned to the plurality of individual pieces of food product that are to be divided from the sheet of food product. An intermittently movable cutting plate preferably includes a plurality of cutting openings for dividing the sheet of food product into the plurality of individual pieces of food product. Preferably, the marking on the sheet of food product is substantially aligned to the plurality of individual pieces of food product divided from the sheet of food product.

The system for aligning a mark to a plurality of individual pieces of food product to be divided from a sheet of food product before the individual pieces of food product are at least partially divided from the sheet of food product may preferably further comprise a compression device. In an exemplary embodiment, the compression device is operatively supported and movable with respect to a cutting plate for forcing the sheet of food product through the cutting openings of the cutting plate. In one aspect of the present invention, the compression device may include a compression roller operatively positioned with respect to the cutting plate.

The marking device may also include stamping, rolling, embossing or cutting devices for stamping, impressing, embossing or cutting or applying a pattern onto the plurality of individual pieces of food product to be divided from the sheet of food product. Also, the marking device may include a food product depositor for depositing an additional food product onto the plurality of individual pieces of food product to be divided from the sheet of food product.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 6 is a perspective view of a portion of a stripper plate of the present invention showing in particular a spiral shaped opening which the marking head of FIG. 5 can pass through.

DETAILED DESCRIPTION

The present invention provides systems and methods for marking a plurality of individual pieces of food product that are to be divided from a sheet of food product such as a sheet of dough product. The present invention may also be used with other food products such as fruit snacks and pasta and masa type products. In particular, the present invention has been developed for the ability to provide a mark that is aligned, in a desired way, to each of a plurality of individual pieces of food product to be divided from a sheet of food product. That is, by the present invention, a mark can be formed that is aligned to each of a plurality of individual pieces of food product before the pieces of food product are completely divided from a sheet of food product.

In accordance with the present invention, a mark may be created by any process that adds to, removes from, or otherwise modifies a food product in some desired way such as in appearance. For example, a pattern or imprint may be formed on a food product such as by stamping, impressing, embossing or cutting or the like to provide a pattern. Also, food products or portions thereof may be shaped by similar processes, which may also provide a pattern or mark in accordance with the present invention. Moreover, certain food products may include deposits formed thereon, which may be food products, decorative items, either edible or inedible, or may include packaging or other related materials or the like, all of which are contemplated to provide a mark.

Figure 1:
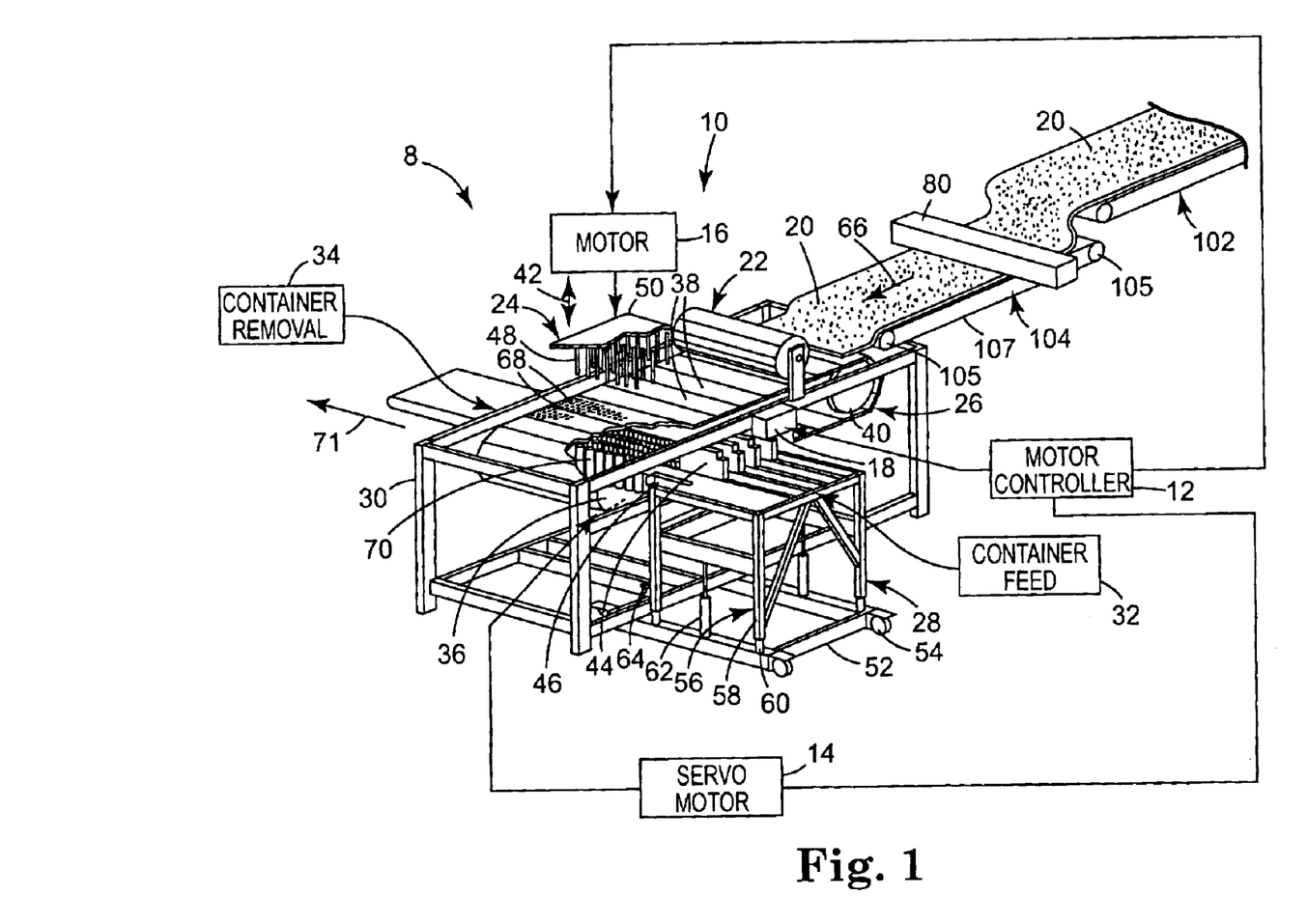
FIG. 1 is an apparatus for cutting and packing a food product in accordance with the present invention.

In FIG. 1 a perspective view of an exemplary dough marking, cutting, and packing system 8 according to the present invention, is shown. As mentioned above, devices for cutting a sheet of food product such as a sheet of dough into individual dough slugs or pieces and packing the individual dough pieces into containers are generally known. For example, U.S. Pat. No. 3,427,783 to Reid, the entire disclosure of which is incorporated herein by reference, describes one such dough cutting and packing apparatus. Other features and modifications applicable to the Reid apparatus are included in U.S. Pat. No. 5,247,782 to Rejsa, which is also fully incorporated herein by reference.

By the illustrated system 8, a sheet of dough product 20 may be continuously fed to an intermittently movable cutter bar assembly 26 of a cutting and packaging apparatus 10 in a machine direction 66. The system 8 also includes a marking device 80 positioned above an intermittent conveyor 104 for marking the sheet of dough product as described in greater detail below.

Figure 2:
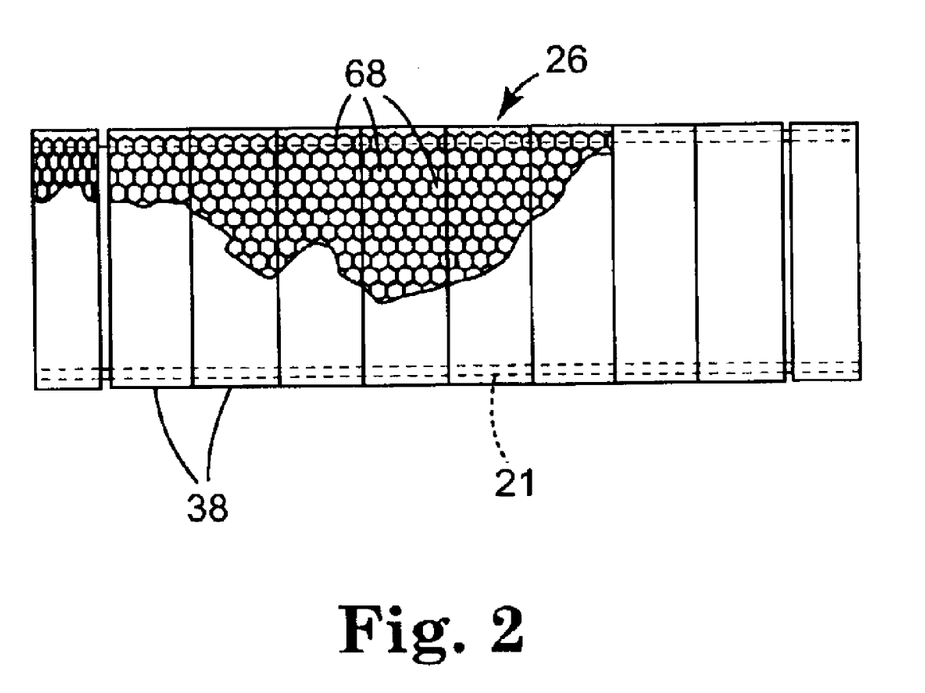
FIG. 2 is a cutter bar assembly of the apparatus of FIG. 1 showing in particular hexagonally shaped cutting openings of cutting plates of the cutter bar assembly.

As an example of a cutting and packaging apparatus 10 usable in accordance with the present invention, the exemplary illustrated apparatus 10 of FIG. 1, includes drive controller 12, servo drive 14, drive device 16, and servo drive 18, press roller 22, packing head assembly 24, container advancement module 28, container feed mechanism 32 and container removal mechanism 34. Drive controller 12 is preferably a digital computer, a micro controller, or another suitable control element, which is coupled to drives 14, 16 and 18. Servo drive 14 may be coupled, through a drive shaft with a gearbox (not shown), to a drive roller 36 supported for rotation by frame 30. Drive roller 36 and idler roller 40 each have a pair of hubs supporting a pair of sprockets, which mate with a pair of drive chains 21 (see FIG. 2). The drive chains support a plurality of cutting plates 38, which cutting plates 38 preferably include a plurality of cutting openings 68 as can be seen in FIG. 2. The plurality of cutting plates 38 are coupled to one another by the drive chains, which chains are threaded around the hubs of drive roller 36 and idler roller 40 to form an endless belt of cutting plates 38. Preferably drive device 16 is coupled to packing head assembly 24. Drive device 16 drives packing head assembly 24 in a reciprocal motion in the direction indicated by arrow 42. Packing head assembly 24 includes a plurality of packing plungers or tubes 48 which extend out and away from a base plate 50.

As shown, an exemplary container advancement module 28 includes a base 52 supported by wheels 54. Module 28 also includes an upper portion 56 having four hollow members 58 mounted over four pins 60. Pins 60 telescope within hollow members 58. The four hollow members 58 support gear boxes 44 and flighted augers or screws 46. In addition, the entire upper portion 56 of module 28 is supported for vertical movement by actuation of extension cylinders 62 and as guided by the telescoping action of pins 60 within members 58. A pair of locator pins 64 extend downwardly from the upper portion 56 of module 28 and mate with a pair of locator apertures (not shown) on frame 30. The locator pins are preferably cone shaped so as to be self-centering in the apertures. Servo drive 18 is mounted on frame 30 and has a drive shaft releasably coupled to gear boxes 44. Servo drive 18 drives rotation of augers 46 through gear boxes 44.

In operation, the dough sheet 20 is advanced in the machine direction indicated by arrow 66. Each of the cutter plates 38 may be formed of a suitable rigid material defining a plurality of shaped openings 68. Preferably, the shaped openings 68 are hexagonally shaped to minimize waste. As dough sheet 20 moves in the machine direction 66, press roller 22 presses the dough into the hexagonal-shaped openings 68 in the cutter plate 38 below press roller 22. This causes the dough to be separated into hexagonally shaped dough pieces. The dough pieces are retained within the openings 68 in cutter plate 38, and the cutter plates 38 are sequentially advanced in the direction indicated by arrow 66 toward packing head assembly 24. During advancement of cutter plate 38, container advancement module 28 advances a plurality of containers 70 in a direction indicated by arrow 71 transverse to the direction of movement of dough sheet 20. The containers 70 can be fed to module 28 by container feed mechanism 32 which may comprise any known, commercially available, container feed mechanism, such as an endless conveyor. It is noted that any container advancement technique or method may be used in that the manner by which the containers are advanced is not of particular importance to the principles of the present invention. The same is true with respect to the manner by which the packing head assembly 24 is utilized and designed to pack the dough.

When any particular cutter plate 38 is positioned beneath packing head assembly 24, packing head assembly 24 can reciprocate downward and plungers 48 can extend through openings 68 in such cutter plate 38. Thus, plungers 48 press the dough pieces retained in openings 68 down and out of the bottom of each successive cutter plate 38. Plungers 48 push the dough pieces into containers 70 which are positioned beneath openings 68, such as by the flighted augers 46 of illustrated module 28. Once the dough pieces are removed from openings 68 in a particular cutter plate 38, the endless cutting unit can be advanced by servo drive 14 so that the next subsequent cutter plate 38 is positioned beneath packing head assembly 24. The containers 70 are then advanced by servo drive 18 in the transverse direction indicated by arrow 71 to be positioned beneath the next subsequent openings 68 in the cutter plate 38. At this point, packing head assembly 24 can again reciprocate downward and pack another dough piece in the containers 70.

Intermittent advancement of the cutter plates 38 and containers 70 is repeated, and dough pieces are placed in containers 70, until containers 70 are full. After that, containers 70 can be removed from dough packing apparatus 10 by a conventional container removal device 34, which may be any suitable, commercially available, container removal device, such as an endless conveyor. Such intermittent or indexed motion of the cutter plates 38 facilitates the reciprocal motion of the plungers 48 for removal of the dough pieces from the openings 68 of the cutter plate 38.

A supply conveyor 102 preferably feeds dough sheet 20 to an intermittently movable conveyor 104, which, in turn, feeds dough sheet 20 to apparatus 10 during advancement periods separated by dwell or rest periods of the conveyor 104. Intermittent advancement of cutter plates 38 is preferably matched with respect to velocity and timing with that of the conveyor 104. Moreover, such advancement of cutter plates 38 is performed intermittently between reciprocal strokes of head assembly 24 so that packing can be done with the cutter plates 38 in a dwell period. For example, a first cutter plate 38 is advanced to a position under head assembly 24. Then, advancement of the cutter plate 38 stops and head assembly 24 reciprocates to remove dough pieces from the cutter plate under head assembly 24. In order to accommodate the continuous to intermittent motion, an accumulating function is preferably provided between the continuous movement of the supply conveyor 102 and the intermittent movement to accumulate a portion of the dough sheet 20 that is fed during dwell periods. After the dough pieces are removed, the cutter plates 38 are again indexed until the next subsequent cutter plate 38 is positioned under head assembly 24 at which time reciprocal motion of head assembly 24 removes retained dough pieces from openings 68 in that next cutter plate 38. As part of each index, new dough is pressed into the upstream cutter plate 38 by press roller 22. The period during which cutter plates 38 are advanced is referred to as an advancement time period and the period during which dough portions are being removed by reciprocation of head assembly 24 is referred to as a dwell time.

An exemplary system 100, includes a cutting and packing apparatus similar to the apparatus 10 described above, is shown schematically in FIG. 3. As described in detail below, the system 100 may be used to provide aligned marks on a plurality of dough pieces to be divided from a dough sheet. An exemplary mark that can be provided is a generally spiral shaped mark, pattern or cut, which can advantageously be done to give the appearance of a rolled dough product without actually rolling the dough product such as for cinnamon rolls and the like.

Figure 3:
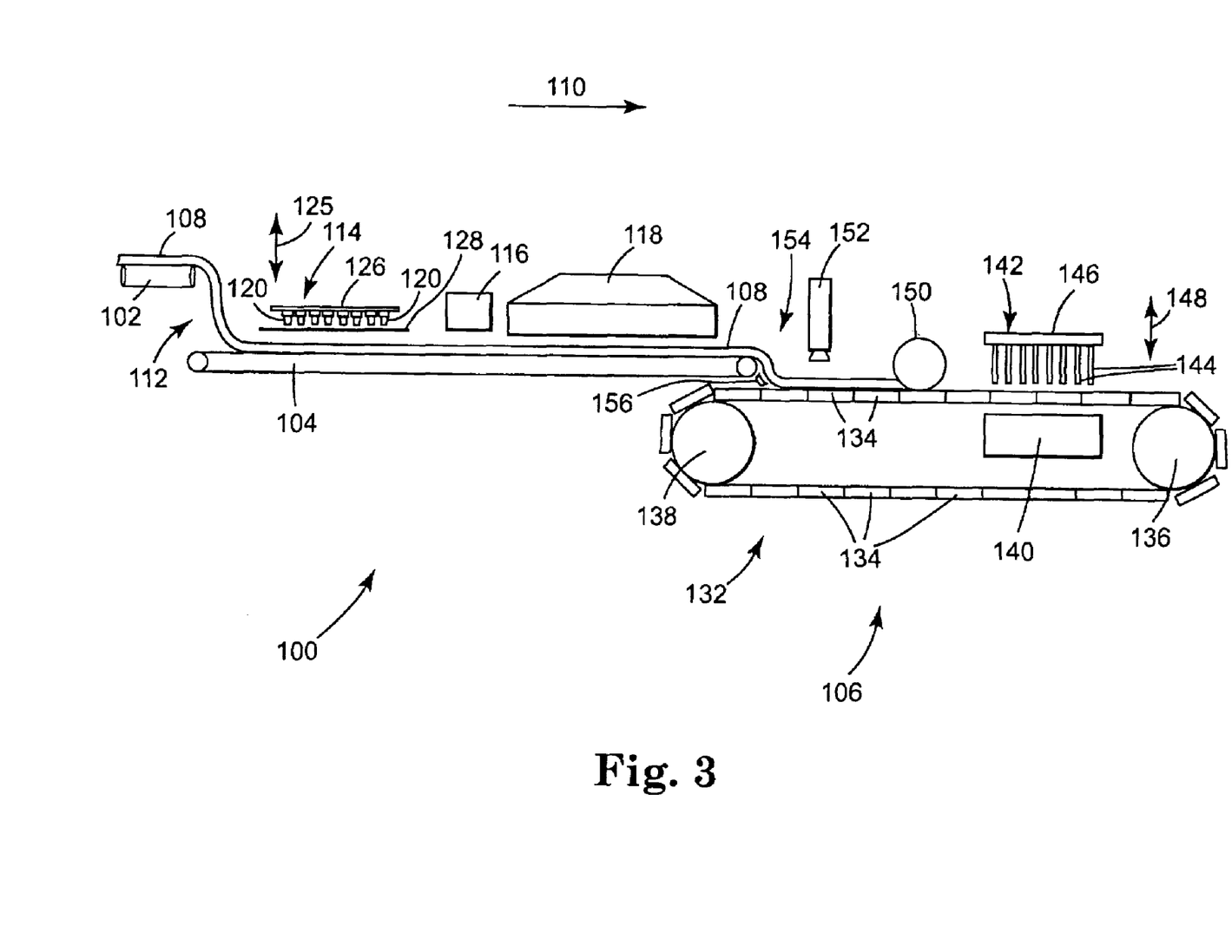
FIG. 3 is a schematic view of a system for marking, cutting, and packing a food product in accordance with the present invention showing in particular a marking device.

Generally, as shown, the exemplary system 100 includes the supply conveyor 102, the intermittently movable conveyor 104, and a cutting and packing apparatus 106. As shown, the system 100 can move a sheet of food product 108 through the processing system 100 in a machine direction 110.

The supply conveyor 102 can continuously supply a sheet of food product 108 from a desired source to the intermittent conveyor 104. The source (not shown) can be any dough making apparatus or the like. In this case where the supply conveyor 102 supplies the sheet of food product 108 continuously and the intermittent conveyor 104 moves intermittently, the system 100 preferably includes an accumulating zone 112 between the supply conveyor 102 and the intermittent conveyor 104 to permit controlled transfer of a dough sheet from the continuous motion to the intermittent motion. As described below, the intermittent conveyor 104 provides accurate control of the motion of the sheet of food product 108 with respect to the motion of the cutter plates 38 of the apparatus 10.

The supply conveyor 102 and the intermittent conveyor 104 are spaced apart to form the accumulating zone 112 so that a varying length portion of the sheet of food product 108 can be temporarily accumulated during dwell periods of the intermittent conveyor 104. As the continuously moving sheet of food product 108 falls from the conveyor 102 towards the intermittent conveyor 104 a partial loop of the sheet of food product 108 is created during the dwell period and accumulated. As the intermittent conveyor 104 moves forward in the advancement period, the partial loop is then delivered to the intermittent conveyor 104. The spacing between the supply conveyor 102 and the intermittent conveyor 104 can be determined by considering factors such as the speed of the supply conveyor 108, the dwell period and advancement period of the intermittent conveyor 104, as well as properties of the food product such as its thickness and flexibility for example. The accumulating zone 102 may utilize any conventional device(s) such as movable rollers or the like to provide an accumulating function.

In a preferred aspect of the present invention, the intermittent conveyor 104 is a positively driven conveyor. That is, the intermittent conveyor 104 can be driven in such a way so as to avoid slippage of its conveyor belt 107 with respect to a drive device 105 such as a sprocket or other positively engageable drive device or the like. The intermittent conveyor 104 may be driven by any suitable drive device such as servo motors or the like. Alternatively, the intermittent conveyor 104 may be driven either directly or indirectly by a drive device of the cutting and packing apparatus 106 as is described below. That is, the intermittent conveyor 104 may be timed with or otherwise interconnected with the intermittent motion of the cutting a packing apparatus 106.

Further referring to the embodiment illustrated in FIG. 3, the processing system 100 may include one or more processing stations positioned relative to the intermittent conveyor 104 and/or the supply conveyor 102 along the machine direction 110. A marking device 114 is positioned relative to the intermittent conveyor 104 and is described in greater detail below. The processing system 100 may also include additional processing stations such as a coating device 116 and/or a temperature control region 118. For purposes of one exemplary description, the processing system 100 described below may be utilized to process a food product such as a dough product in order to form individual food products such as cinnamon rolls or the like. However, it should be understood that other food products may be produced in accordance with this invention such as fruit snacks, pasta and masa products and the like. As such, the marking device 114 may be utilized to form generally spiral shaped marks or patterns on each piece to be cut or imprinted. The coating device 116 may be utilized, for example, to deposit a flavored topping such as a heated icing or the like, and the temperature controlled region 118 may be utilized to cool to the heated icing as desired. It is contemplated, however, that the processing system 100 may include any number of processing stations or zones arranged in any desired order. Moreover, with exception to the marking device's position to an intermittently moveable conveyor, other stations, zones or features may be positioned to a continuously moveable conveyor or an intermittently movable conveyor. With respect to the illustrated system of FIG. 3, the topping and cooling could be done while the dough sheet is on conveyor 102 instead. The processing system may, as suggested above, be utilized for processing various food products and is not limited to dough products.

Generally, as shown, the marking head 114 preferably includes movable marking devices 120 and a stripper plate 128, which is movable. The marking devices 120 and stripper plate 128 are controllably movable with respect to each other as described in detail below so that the sheet of food product 108 can be marked by engaging the sheet of food product with the marking devices 120 and retracting the marking devices 120 while holding the sheet of food product 108 with the stripper plate 128. Further referring to FIG. 3 and also to FIG. 4, a plurality of marking devices 120 are shown attached to a base plate 126. The base plate 126 allows one or more marking devices 120 to be utilized together. The marking devices 120 are movable with respect to the intermittent conveyor 104. That is, the marking devices 120 are capable of being moved along a marking direction 125 to engage with the sheet of food product 108 during the dwell period of the intermittent conveyor 104. This motion may be obtained by utilizing any mechanical system or device capable of controllably moving the marking devices 120 between a retracted position such as is illustrated in FIG. 3 and an engaged position (not shown). The marking head 114 may comprise any device, for forming a mark in accordance with the present invention, such as a roller device, stamping device, depositor device, or the like.

Figure 5:
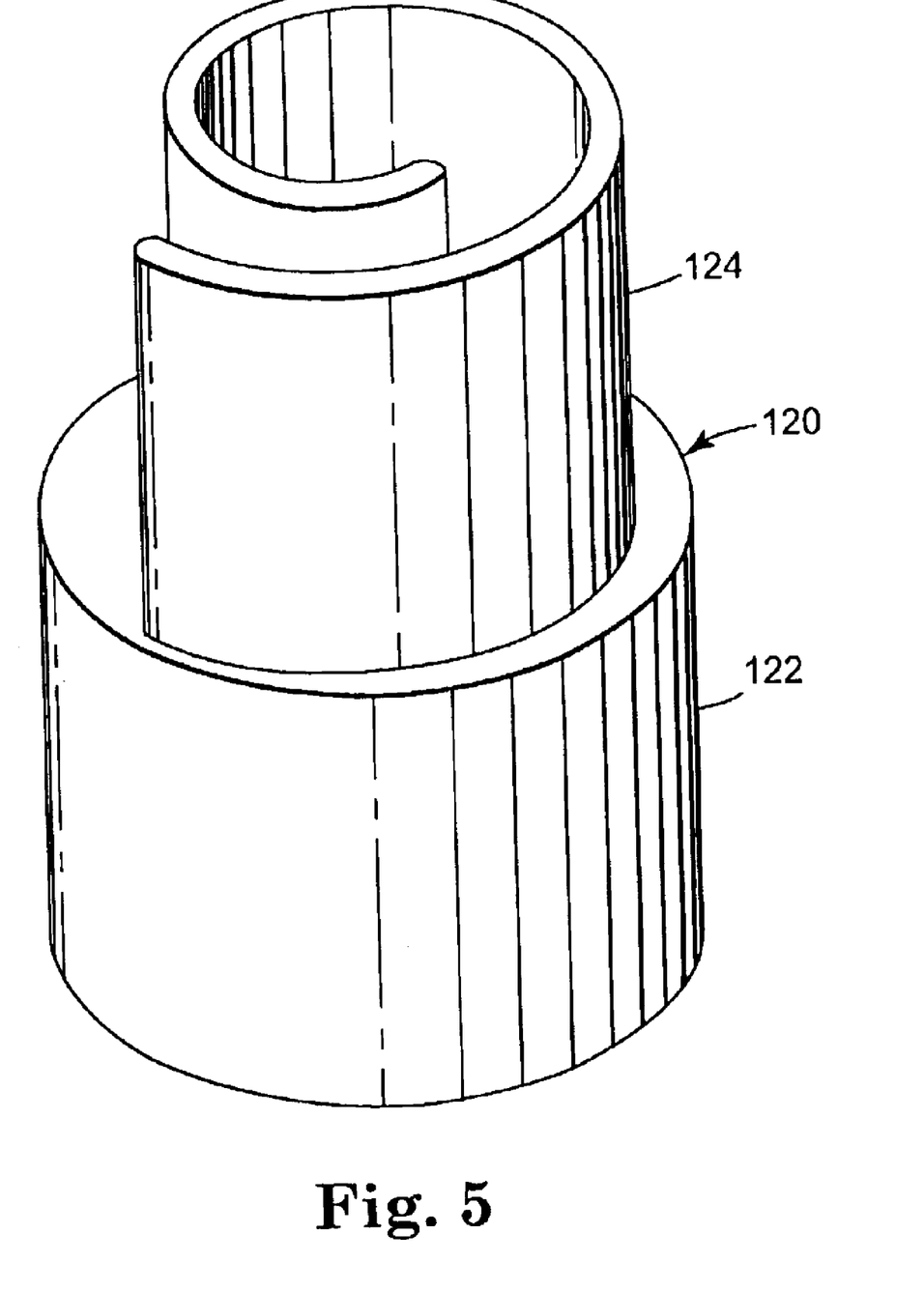
FIG. 5 is a perspective view of a marking head for marking a food product in accordance with the present invention.

Referring to FIG. 5, a perspective view of an exemplary marking device 120 of the marking head 114 is shown. Marking device 120 includes a base 122 for attaching the marking device 120 to the base plate 126. In the present embodiment, plural marking devices are arranged in a regular pattern or array on the base plate 126. The marking device 120 is this example includes a spiral shaped cutting blade 124 supported by the base 122. Each cutting blade 124 is capable of engaging with the sheet of food product 108 and marking the sheet of food product 108 by cutting and/or displacing at least some of the food product. It is contemplated that the cutting blade 124 may be blunt, sharp, heated, chilled, or coated to provide marking capabilities in accordance with any desired application. For example, the cutting blade 124 may be coated with Teflon® or other suitable nonstick material in order to prevent food product from sticking to the cutting blade 124 in operation. Moreover, the blade can be designed to accommodate the depth of any pattern to make the desired appearance of any such feature (e.g., blunt for a flat score or sharp for a deeper cut, etc.).

In accordance with the present invention, the marking devices 120 may have any number of cutting blades, shaping tools, marking tools, or food product depositor devices or any other marking or pattern applying devices. For example, the marking devices 120 may comprise a tool(s) capable of imparting a desired shape to a piece of food product to be divided from a sheet of food product such as a cookie or biscuit or the like. Also, the marking devices 120 may include a marking tool(s) such as a marking tool capable of forming a crosshatched pattern on a food product.

Figure 6:
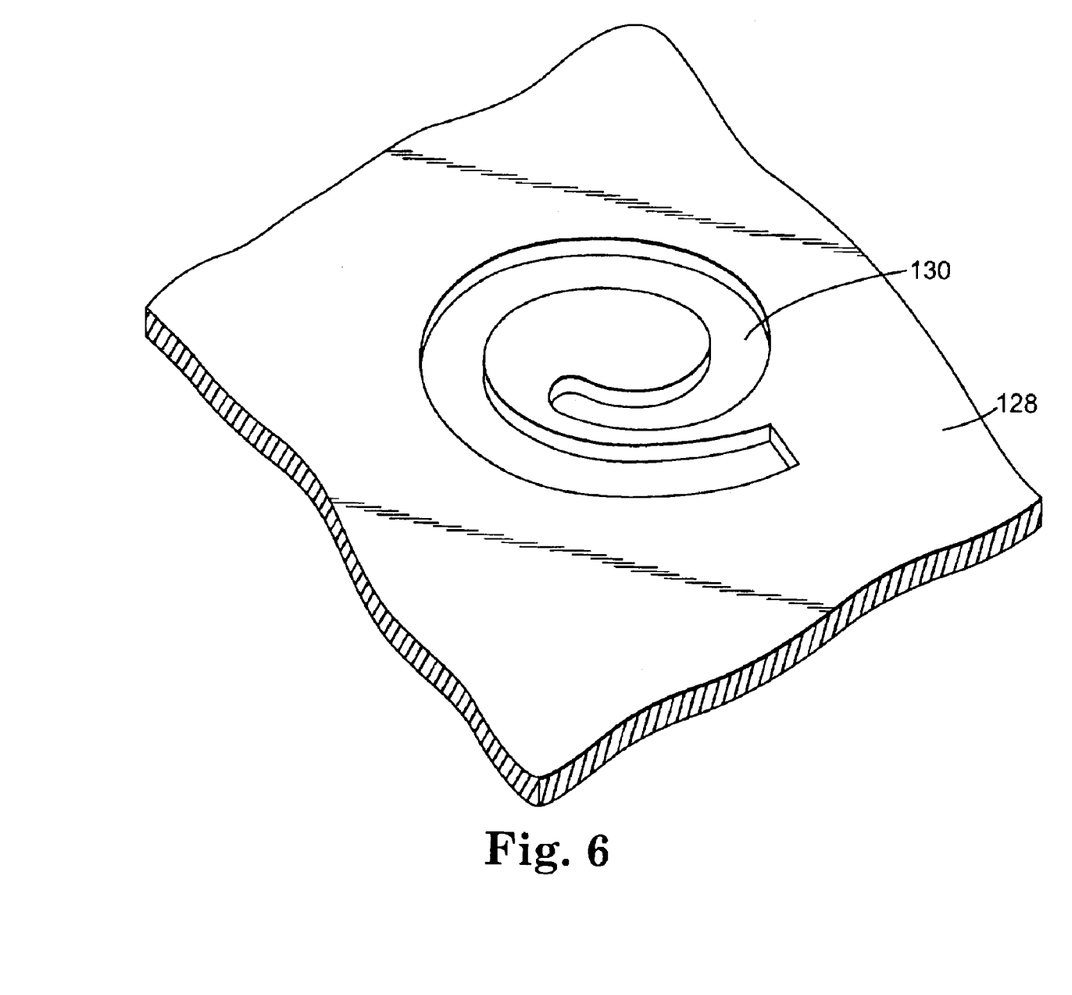

Again referring to FIGS. 3 and 4, the stripper plate 128 is shown positioned above the sheet of food product 108. As can be seen in FIG. 6, the stripper plate 128 includes openings 130 capable of allowing one or more of the marking devices 120 to pass through the stripper plate 128. FIG. 6 illustrates a portion of the stripper plate 128 that corresponds to one of the marking devices 120. As shown, the opening 130 is spiral shaped and provides appropriate clearance such that a cutting blade 124 of a marking device 120 can pass through the opening 130. That is, the stripper plate 128 is capable of engaging as much of the dough sheet 108 as possible while also allowing a dough engaging marking device, such as the marking device 120 to pass through. Alternatively, the opening 130 may be generally circular in shape with a diameter allowing clearance for the outside diameter of a marking device 120. It is contemplated, that the opening may be slot shaped or rectangularly shaped so that one or more marking devices 120 can pass through the stripper plate 128.

Figure 4:
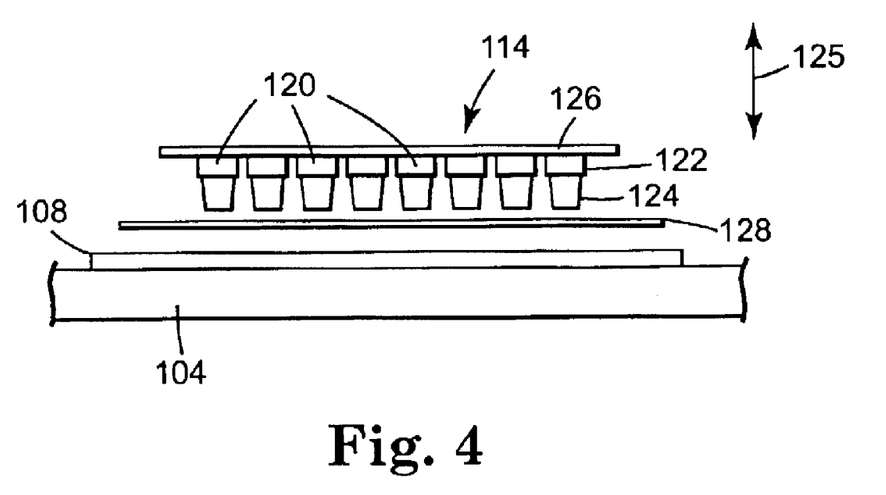
FIG. 4 is a schematic view of the marking device of FIG. 3.

For certain applications, the stripper plate 128 may be utilized to hold the sheet of food product 108 after the marking devices 120 have engaged with the sheet of food product 108 so that the marking devices 120 may be disengaged from the sheet of food product 108 without pulling the sheet of food product 108 away from the intermittent conveyor 104. Accordingly, accurate alignment can be obtained between the intermittent conveyor 104 and dough sheet 108 by holding the dough sheet 108 against the intermittent conveyor 104 while retracting the marking devices 120. In particular, the stripper plate 128 may be needed for food product such as dough products that may be sticky, or that may generally adhere to the marking devices 120.

In general, it is preferred to minimize any deflection of the sheet of food product 108 during a marking of the sheet of food product 108 so that the sheet of food product 108 does not become stretched or distorted. Such stretching or distorting increases the possibility that the markings formed on the sheet of food product 108 would be misaligned during additional processing step such as the cutting steps, described below. As such, the intermittent conveyor 104 preferably provides sufficient support or back pressure for the particular marking step being performed. For example, where the marking comprises impacting the sheet of food product 108 with the marking devices 120 with significant force, the intermittent conveyor 104 provides adequate support means so that deflection of intermittent conveyor 104 is minimized. This may be accomplished by utilizing a rigid belt as part of the intermittent conveyor 104 or by providing a support structure or a support device such as a plate or movable support device(s) positioned generally below the marking devices 120 and a conveyor belt of the intermittent conveyor 104 as needed. Minimal support means may only be needed where the marking step does not impact the sheet of food product 108 with significant force or where the marking step includes depositing certain additional food items onto the sheet of food product 108. As mentioned, distortion of the sheet of food product 108 should be minimized.

In one aspect of the present invention, the marking devices 120 and stripper plate 128, if provided, may be independently movable and drivable with respect to each other such as by comprising the independent drive devices. In another aspect of the present invention the marking devices 120 and stripper plate 128 may be part of a common mechanical system and may be moved together. For example, the stripper plate 128 may be attached to the marking devices 120 in a way to permit limited relative movement but with a resistance providing device between them, which may comprise springs, air cylinders or the like. In such an arrangement, the marking devices 120 may be driven by a drive device thereby moving both the stripper plate 128 and the marking devices 120 together. That is, the stripper plate 128 need not be independently driven. When the stripper plate 128 encounters resistance, such as by contacting the sheet of food product 108 or a mechanical hard-stop or the like positioned outside the dough sheet 108 for example, the marking devices 120 may continue moving into the sheet while relative movement of the marking devices 120 with respect to the stripper plate 128 occurs. For certain applications, however, the stripper plate 128 may reach a position where it moves together with the marking devices 120, such as by encountering a hard stop arranged between them. Also, for certain application, the stripper plate 128 may not be needed at all, such as for food products that can be easily released by the marking devices 120.

As mentioned above, the system 100 preferably includes a cutting and packing apparatus 106. Preferably, the apparatus 106 is similar to the apparatus 10 described previously.

Generally, the preferred cutting and packing apparatus 106 includes an intermittently movable cutter bar assembly 132, which includes cutting plates 134 with cutting openings (not shown). The cutter bar assembly 132 is driven by a drive roller 136 and further carried by an idler roller 138 although any drive arrangement may be used. Also, the apparatus 106 includes a container advancement module 140 and a packing assembly 142. As shown, the packing assembly 142 includes a plurality of plungers 144 attached to a base plate 146 which may be reciprocally moved in a packing direction 148. The apparatus 106 also includes a press roller 150 for pressing the sheet of food product 108 into the cutting plates 134 to divide the sheet of food product 108 into individual pieces of food product.

Again referring to FIG. 3, the processing system 100 includes a transition zone 154 between the intermittent conveyor 104 and the cutting and packing apparatus 106. At the transition zone 154, the sheet of food product 108 moves between the intermittent motion of the intermittent conveyor 104 and the intermittent motion of the cutting plates 134 of the cutter bar assembly 132. Because certain food products, such as dough products, may be susceptible to stretching or distortion that can cause a mark formed by the marking device 114 to becoming misaligned with respect to the cutting openings of the cutting plates 134, several aspects of the transition zone 154 are desired in accordance with the present invention.

The vertical distance between the intermittent conveyor 104 and the cutter bar assembly 132 is minimized. Minimizing the distance between the intermittent conveyor 104 and the cutter bar assembly 132 can advantageously prevent the sheet of food product 108 from stretching or distorting as a result of its own weight. Additionally, a support device 156 such as a plate or appropriately sized roller or the like may be positioned between the intermittent conveyor 104 and the cutter bar assembly 132 so that the support device 156 can provide greater support to the sheet of food product 108 as it transfers between the intermittent conveyor 104 and the cutter bar assembly 132.

In the exemplary embodiment, the intermittent motion of the conveyor 104 and the cutter bar assembly 132 are synchronized such as by using a common drive device or by a control system. Such synchronized motion moves the sheet of food product 108 positioned on the intermittent conveyor 104 and the cutter bar assembly 132 at the same time. Accordingly, a sheet of food product 108 can be advanced by the intermittent conveyor 104 and transferred through the transition zone 154 to the cutter bar assembly 132 without significantly altering the relative position of a mark formed on the sheet of food product 108 and the cutting openings of the cutter bar assembly 132. Although the intermittent conveyor 104 may be an additional component to a processing system, the intermittent conveyor 104 advantageously provides the ability to mark a food sheet and subsequently transfer the marked food sheet to a cutting and packaging apparatus while maintaining alignment of the mark to an individual piece of food product to be divided from the food sheet.

Also as shown in FIG. 3, the processing system 100 may include a vision system 152 such as a camera or the like. The vision system 152 may be positioned above the cutting plates 134 to monitor the alignment of a mark formed on the sheet of food product 108 with respect to the cutting plate 134. That is, the vision system 152 can be positioned to view the cutting openings of the cutting plates 134 without any food product in the system. A reference feature of the vision system 152 can be aligned to one or more cutting openings. Thus, a mark formed on a sheet of food product can be compared to the reference feature of the vision system 152 and adjustments, such as positional relationships between the marking device 114 and the cutting plates 134 or the like may be made if needed.

Accordingly, a mark may be aligned to a plurality individual pieces of food product to be divided from a sheet of food product before the individual pieces of food product are at least partially divided from the sheet of food product by the processing system 100. In accordance with the present invention, a sheet of food product, such as the dough sheet 108 can be continuously supplied to the intermittent conveyor 104 by the continuous conveyor 102. The dough sheet 108 moves through the accumulating zone 112 as the dough sheet 108 transitions from continuous motion to intermittent motion. The intermittent conveyor 104 carries the dough sheet 108 such that the marking device 114 can mark the dough sheet 108. After the dough sheet 108 is marked by the marking device 114, the dough sheet is transferred from the conveyor 104 to the cutter bar assembly 132. A mark formed on the dough sheet 108 is accurately aligned to a cutting opening 68 of a cutting plate 134 of the cutter bar assembly 132 after such transfer. In particular, the transfer distance between the conveyor 104 and the cutter bar assembly 132 (at the transfer zone 154) is minimized for maintaining accurate alignment of a mark to a cutting opening 68. Also, the transfer zone 154 utilizes the support device 156 to prevent sagging or stretching of the dough sheet 108 for maintaining alignment between a mark and a cutting opening 68. Accordingly, a mark can be aligned to individual pieces of food product to be cut from the dough sheet 108 before the individual pieces of food product are cut from the dough sheet 108.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of aligning a mark to a plurality of individual pieces of food product to be divided from a sheet of food product before the individual pieces of food product are at least partially divided from the sheet of food product, the method comprising the steps of:

providing a continuous feed of a sheet of food product;

transferring the continuously fed sheet of food product to an intermittently movable conveyor by way of an accumulating zone that can accumulate at least a portion of the continuously fed sheet of food product during a dwell portion of the intermittently movable conveyor;

marking the sheet of food product while the sheet of food product is carried by the intermittently movable conveyor;

feeding the marked sheet of food product to an intermittently movable cutting plate having a plurality of cutting openings so that the cutting openings are aligned to the marked sheet of food product as desired;

dividing, at least partially, the sheet of food product into individual pieces of food product.

2. The method of claim 1, wherein the marking step comprises stamping a pattern onto the plurality of individual pieces of food product to be divided from the sheet of food product.

3. The method of claim 1, wherein the marking step comprises cutting a pattern into the plurality of individual pieces of food product to be divided from the sheet of food product.

4. The method of claim 1, wherein the marking step comprises depositing an additional food product onto the plurality of individual pieces of food product to be divided from the sheet of food product.

5. The method of claim 1, wherein the marking step comprises marking the plurality of individual pieces of food product to be divided from the sheet of food product with a spiral mark capable of forming an individual piece of food product that has the general appearance of a rolled food product.

6. The method of claim 1, wherein the step of feeding the marked sheet of food product to an intermittently movable cutting plate comprises transferring the marked sheet of food product from the intermittently movable conveyor to the intermittently movable cutting plate.

7. The method of claim 1, wherein the step of dividing, at least partially, the sheet of food product into individual pieces of food product comprises forcing the sheet of food product through the cutting openings of the cutting plate with a compression device.

8. The method of claim 1, further comprising the step of positively driving the intermittently movable conveyor.

9. The method of claim 1, further comprising the step of packing the individual pieces of marked food product into containers.

10. The method of claim 1, further comprising the step of monitoring the alignment of a mark formed by the marking step by using a vision system.

11. A system for aligning a mark to a plurality of individual pieces of food product to be divided from a sheet of food product before the individual pieces of food product are at least partially divided from the sheet of food product, the system comprising:
- a supply device for supplying a continuous sheet of food product;
- an intermittently movable conveyor operatively positioned with respect to the supply device and having a surface for supporting and carrying the sheet of food product supplied by the supply device in a machine direction;
- an accumulating zone, positioned between the supply device and the intermittently movable conveyor, for permitting accumulation of a portion of the sheet of food product as the sheet of food product transfers from the continuous motion of the supply device to the intermittent motion of the intermittently movable conveyor;
- a marking head operatively positioned with respect to the surface of the intermittently movable conveyor for marking the sheet of food product, the marking to be aligned to the plurality of individual pieces of food product that are to be divided from the sheet of food product; and
- at least one intermittently movable cutting plate having a plurality of cutting openings for dividing the sheet of food product into the plurality of individual pieces of food product wherein the marking on the sheet of food product can be aligned to the plurality of individual pieces of food product divided from the sheet of food product.

12. The system of claim 11, wherein the marking head comprises a stamp for forming a pattern onto the individual pieces of food product to be divided from the sheet of food product.

13. The system of claim 11, wherein the marking head comprises a cutting device for cutting a pattern into the individual pieces of food product to be divided from the sheet of food product.

14. The system of claim 11, wherein the marking head comprises a food product depositor for depositing an additional food product onto the individual pieces of food product to be divided from the sheet of food product.

15. The system of claim 11, further comprising a compression device for forcing the sheet of food product through the cutting openings of the cutting plate.

16. The system of claim 15, wherein the compression device comprises a compression roller operatively positioned with respect to the cutting plate.

17. The system of claim 11, further comprising a vision system operatively positioned with respect to the intermittently moving cutting plate for viewing the mark on the sheet of food product.

18. The system of claim 11, further comprising one or more processing stations positioned relative to the intermittently movable conveyor and along the machine direction.

19. The system of claim 11, further comprising a packing device operatively positioned with respect to the intermittently movable cutting plate for packing the individual pieces of food product divided from the sheet of food product into containers.

20. The system of claim 11, wherein marking head comprises a marking device having a spiral shaped cutting blade.

* * * * *